United States Patent
Kawakubo

(10) Patent No.: US 10,832,838 B1
(45) Date of Patent: Nov. 10, 2020

(54) RUTHENIUM OXIDE POWDER, THICK FILM RESISTOR COMPOSITION, THICK FILM RESISTOR PASTE, AND THICK FILM RESISTOR

(71) Applicant: SUMITOMO METAL MINING CO., LTD., Tokyo (JP)

(72) Inventor: Katsuhiro Kawakubo, Ome (JP)

(73) Assignee: SUMITOMO METAL MINING CO., LTD., Tokyo (JP)

(*) Notice: Subject to any disclaimer, the term of this patent is extended or adjusted under 35 U.S.C. 154(b) by 0 days.

(21) Appl. No.: 16/497,045

(22) PCT Filed: Mar. 23, 2018

(86) PCT No.: PCT/JP2018/011624
§ 371 (c)(1),
(2) Date: Sep. 24, 2019

(87) PCT Pub. No.: WO2018/180959
PCT Pub. Date: Oct. 4, 2018

(30) Foreign Application Priority Data

Mar. 28, 2017 (JP) .................................. 2017-063653

(51) Int. Cl.
*H01C 7/00* (2006.01)
*C01G 55/00* (2006.01)
*C03C 8/16* (2006.01)

(52) U.S. Cl.
CPC ........... *H01C 7/003* (2013.01); *C01G 55/004* (2013.01); *C03C 8/16* (2013.01)

(58) Field of Classification Search
CPC .............................. H01C 7/003; C01G 55/004
See application file for complete search history.

(56) References Cited

U.S. PATENT DOCUMENTS

| | | | | | |
|---|---|---|---|---|---|
| 4,476,039 A | * | 10/1984 | Hormadaly | ........ | H01C 17/0654 252/519.13 |
| 4,961,999 A | * | 10/1990 | Hormadaly | ............... | C03C 8/14 428/427 |
| 5,474,711 A | * | 12/1995 | Borland | ............. | H01C 17/0654 106/1.25 |
| 6,406,646 B1 | * | 6/2002 | Lee | ................... | H01C 17/06553 252/514 |

FOREIGN PATENT DOCUMENTS

| | | |
|---|---|---|
| EP | 0628974 | 12/1994 |
| JP | S52-052933 | 4/1977 |
| JP | H07-022202 | 1/1995 |
| JP | 2005-209740 | 8/2005 |
| JP | 2005-235754 | 9/2005 |
| WO | 2012/176696 | 12/2012 |

OTHER PUBLICATIONS

International Search Report dated Jun. 19, 2018 with respect to PCT/JP2018/011624.

* cited by examiner

*Primary Examiner* — Kyung S Lee
(74) *Attorney, Agent, or Firm* — IPUSA, PLLC

(57) ABSTRACT

A ruthenium oxide powder having a rutile crystal structure is provided, wherein a crystallite diameter D1, calculated from a peak of a (110) plane measured by an X-ray diffraction method, is 25 nm or more and 80 nm or less, a specific surface area diameter D2, calculated from a specific surface area, is 25 nm or more and 114 nm or less, and a ratio of the crystallite diameter D1 (nm) to the specific surface area diameter D2 (nm) satisfies a following formula (1).

$$0.70 \leq D1/D2 \leq 1.00 \qquad (1)$$

7 Claims, No Drawings

US 10,832,838 B1

RUTHENIUM OXIDE POWDER, THICK FILM RESISTOR COMPOSITION, THICK FILM RESISTOR PASTE, AND THICK FILM RESISTOR

TECHNICAL FIELD

The present invention relates to a ruthenium oxide powder, a thick film resistor composition, a thick film resistor paste, and a thick film resistor.

BACKGROUND ART

Generally, thick film resistors, such as chip resistor units, hybrid ICs, or resistance networks, are formed by printing and firing a thick 20 film resistor paste on a ceramic substrate. As a thick film resistor composition included in a thick film resistor paste, a composition that includes a powder of an oxide containing ruthenium represented by ruthenium oxide as conductive particles and a glass powder as the main components, is widely used.

A thick film resistor composition, including a powder of an oxide containing ruthenium and a glass powder as the main components, is widely 30 used as described above, because a thick film resistor paste including the above-described thick film resistor composition can form a resistor having a wide range of resistance values.

When a thick film resistor is manufactured by using a thick film resistor paste including a thick film resistor composition including a powder of an oxide containing ruthenium and a glass powder as the main components, the resistance value of the obtained thick film resistor can be changed according to the compound ratio of the powder of the oxide containing ruthenium and the glass powder.

Specifically, by increasing the compound ratio of the powder of the oxide containing ruthenium, which includes conductive particles, in the thick film resistor composition, the resistance value of the obtained thick film resistor can be decreased. Further, by decreasing the compound ratio of the powder of the oxide containing ruthenium, which includes conductive particles, in the thick film resistor composition, the resistance value of the obtained thick film resistor can be increased. Thus, by adjusting the compound ratio (content ratio) of the powder of the oxide containing ruthenium, which includes conductive particles, and the glass powder, in the thick film resistor composition, it is possible to obtain a thick film resistor having the desired resistance value.

As an oxide containing ruthenium, a ruthenium oxide ($RuO_2$) having a rutile crystal structure and lead ruthenate ($Pb_2Ru_2O_{6.5}$) having a pyrochlore crystal structure are known.

When a thick film resistor composition including a ruthenium oxide ($RuO_2$) powder and a glass powder as the main components is used, for example, by setting the width of the resistor as 1.0 mm, the length of the resistor as 1.0 mm, and the film thickness as 7 μm to 10 μm, a thick film resistor having a resistance value of $10^1 \Omega$ to $10^6 \Omega$ can be formed.

Further, when a thick film resistor composition including a lead ruthenate ($Pb_2Ru_2O_{6.5}$) powder and a glass powder as the main components is used, for example, by setting the resistor width as 1.0 mm, the resistor length as 1.0 mm, and the film thickness as 7 μm to 10 μm, a thick film resistor having a resistance value of $10^3 \Omega$ to $10^8 \Omega$ can be formed.

Lead ruthenate ($Pb_2Ru_2O_{6.5}$) has a higher electrical resistivity than ruthenium oxide ($RuO_2$), and, therefore, lead ruthenate ($Pb_2Ru_2O_{6.5}$) is suitable as a raw material for a thick film resistor with high electrical resistivity.

Incidentally, the number of resistor units mounted in electrical/electronic equipment is increasing, and it is desirable that the resistance temperature coefficient of each resistor unit is close to zero. Generally, the resistance temperature coefficient of a resistor unit is expressed as COLD-TCR, which represents the change in the resistance value in 25° C. to −55° C. as the change rate per 1° C. by using 25° C. as a reference, and HOT-TCR, which represents the change in the resistance value in 25° C. to 125° C. as the change rate per 1° C. by using 25° C. as a reference.

Further, it is known that by further adding an inorganic compound as an additive to a thick film resistor composition including a powder of the oxide containing ruthenium and a glass powder as the main components, it is possible to adjust the resistance temperature coefficient and electrical characteristics with respect to noise of the obtained thick film resistor, by a thick film resistor paste including the aforementioned thick film resistor composition.

For example, Patent Document 1 discloses an invention for addressing the problem of providing a conductive material having a high resistance value of 10 kΩ/□ (kilo-ohms per square) or more and capable of realizing a resistor having both a resistance temperature characteristic (TCR) and a withstand voltage characteristic (STOL). Also, Patent Document 1 discloses a resistor manufactured by using a resistor paste obtained by kneading ruthenium oxide ($RuO_2$) having a large average particle diameter that has been crushed after heat treatment at a high temperature, a glass composition powder, an additive, and an organic vehicle.

CITATION LIST

Patent Literature

[PTL 1]
Japanese Unexamined Patent Application Publication No. 2005-235754

SUMMARY OF INVENTION

Technical Problem

However, in the resistor paste disclosed in Patent Document 1, it is necessary to combine a large amount of additives exceeding 20% by mass in order to improve the resistance temperature coefficient of the obtained resistor. When it is essential to combine the resistor paste with an additive exceeding 20% by mass in order to suppress the resistance temperature coefficient, it means that there will be a low degree of freedom in adjusting the electrical characteristics of the thick film resistor manufactured by using the resistor paste, and means that it is difficult to commercially supply thick film resistors having the same electrical characteristics.

Therefore, the ruthenium oxide used in the resistor paste disclosed in Patent Document 1 is not a ruthenium oxide suitable for manufacturing a thick film resistor having an electrical resistivity in the high range, and is not a ruthenium oxide capable of achieving sufficiently good electrical characteristics. Therefore, for example, when the ruthenium oxide disclosed in Patent Document 1 is used, in a thick film resistive body in which the compound ratio of the ruthenium oxide is low and the resistance value is high, it has been difficult to make the resistance temperature coefficient close to zero.

In view of the above problems of the conventional technology, it is an object of one aspect of the present invention to provide a ruthenium oxide powder by which a thick film resistor having a resistance temperature coefficient that is close to zero and having excellent electrical characteristics, can be manufactured.

Solution to Problem

In order to solve the above problem, the present invention provides a ruthenium oxide powder having a rutile crystal structure, wherein a crystallite diameter D1, calculated from a peak of a (110) plane measured by an X-ray diffraction method, is 25 nm or more and 80 nm or less, a specific surface area diameter D2, calculated from a specific surface area, is 25 nm or more and 114 nm or less, and a ratio of the crystallite diameter D1 (nm) to the specific surface area diameter D2 (nm) satisfies a following formula (1).

$$0.70 \leq D1/D2 \leq 1.00 \tag{1}$$

Advantageous Effects of Invention

According to one aspect of the present invention, there is provided a ruthenium oxide powder by which a thick film resistor having a resistance temperature coefficient that is close to zero and having excellent electrical characteristics, can be manufactured.

DESCRIPTION OF EMBODIMENTS

Hereinafter, a ruthenium oxide powder, a thick film resistor composition, a thick film resistor paste, and a thick film resistor according to an embodiment of the present invention will be described.
1. Ruthenium Oxide Powder The ruthenium oxide powder according to the present embodiment is a ruthenium oxide ($RuO_2$) powder having a rutile crystalline structure and can have the following characteristics.

A crystallite diameter D1 calculated from the peak of the (110) plane measured by an X-ray diffraction method is 25 nm or more and 80 nm or less.

A specific surface area diameter D2 calculated from the specific surface area is 25 nm or more and 114 nm or less.

Further, the ratio of the crystallite diameter D1 (nm) to the specific surface area diameter D2 (nm) can satisfy the following formula (1).

$$0.70 \leq D1/D2 \leq 1.00 \tag{1}$$

Note that the crystallite diameter D1 (nm) can be calculated using a measurement value on the (110) plane of the rutile crystal structure by the X-ray diffraction method. The specific surface area diameter D2 (nm) can be calculated as $6 \times 10^3/(\rho \cdot S)$ when the specific surface area of the powder is expressed as S ($m^2/g$) and the density of the powder is expressed as $\rho$ ($g/cm^3$).

The inventor of the present invention has diligently performed research to solve the aforementioned problem of the conventional technology. As a result, the inventor of the present invention found that by controlling the crystallite diameter and the specific surface area diameter in a ruthenium oxide powder, and using a thick film resistor composition including the controlled ruthenium oxide powder and a glass powder, it is possible to manufacture a thick film resistor having a resistance temperature coefficient close to zero and excellent electrical characteristics.

In a thick film resistor containing a powder of an oxide containing ruthenium and a glass powder as the main components, by adjusting the compound ratio of the ruthenium oxide powder and the glass powder, the thick film resistor can have the desired resistance value.

Specifically, if the content ratio of the powder of the oxide containing ruthenium, which includes conductive particles, is increased, the resistance value decreases, and if the content ratio of the powder of the oxide containing ruthenium, which includes conductive particles, is decreased, the resistance value increases.

It is believed that the conductivity mechanism of the thick film resistor containing a powder of an oxide containing ruthenium and a glass powder as the main components, is configured by a combination of metallic conductivity of the powder of the oxide containing ruthenium having a positive resistance temperature coefficient and semiconductive conductivity caused by the reaction phase of the powder of the oxide containing ruthenium and the glass powder having a negative resistance temperature coefficient. For this reason, in the low resistance range where the ratio of powder of the oxide containing ruthenium is high, the resistance temperature coefficient tends to be positive, and in the high resistance range where the ratio of powder of the oxide containing ruthenium is low, the resistance temperature coefficient tends to be negative.

Incidentally, it is known that by adding an inorganic compound as an additive to the thick film resistor composition including a powder of an oxide containing ruthenium and a glass powder, it is possible to adjust the resistance temperature coefficient and electrical characteristics with respect to noise of the obtained thick film resistor. However, although there are some additives that can be used to adjust a positive resistance temperature coefficient to become negative, there is no additive that can used to effectively adjust the resistance temperature coefficient to become positive. Therefore, it has not been possible to adjust a negative resistance temperature coefficient into the positive direction with an additive or the like, and in a high resistance value range in which the resistance temperature coefficient tends to be negative, it has been difficult to make the resistance temperature coefficient to become close to zero.

Accordingly, the inventor of the present invention further studied a thick film resistor manufactured by using a thick film resistor composition including a ruthenium oxide powder and a glass powder. Then, the inventor of the present invention found that when a thick film resistor was manufactured by using a thick film resistor composition including a ruthenium oxide powder and a glass powder, the area resistance value and the resistance temperature coefficient of the obtained thick film resistor will vary, if the crystallite diameter and the specific surface area diameter of the used ruthenium oxide powder vary, even for thick film resistor compositions having the same composition.

Based on the above findings, in the ruthenium oxide powder according to the present embodiment, the crystallite diameter D1, the specific surface area diameter D2, and the ratio D1/D2 of the crystallite diameter to the specific surface area diameter can be set within a predetermined range. Thus, the ruthenium oxide powder according to the present embodiment can be suitably used in manufacturing a thick film resistor having a desired resistance temperature coefficient and electrical characteristics.

Typically, the particle diameter of primary particles in the ruthenium oxide powder used for a thick film resistor is small, so the crystallites are also small, thereby reducing the number of crystal lattices that completely satisfy the Bragg conditions, and broadening the diffraction line profile when irradiated with X-rays. If it is assumed that there is no lattice distortion, the crystallite diameter can be measured and calculated by the following formula (2) as the Scherrer formula, where the crystallite diameter is D1 (nm), the wavelength of the x-ray is λ (nm), the spread of the diffraction line profile at the (110) plane is β, and the diffraction angle as θ. Note that in calculating the spread β of the diffraction line profile at the (110) plane, for example, the half value width of the diffraction peak by Kα1 can be used, by separating the waveform into Kα1 and Kα2 and then correcting the spread caused by the optical system of the measuring instrument.

$$D1\ (nm)=(K\cdot\lambda)/(\beta\cdot\cos\theta) \qquad (2)$$

In formula (2), K is a Scherrer constant, and 0.9 can be used.

In the ruthenium oxide ($RuO_2$) powder, when the primary particle can be regarded approximately as a single crystal, the crystallite diameter measured by the X-ray diffraction method is approximately equal to the particle diameter of the primary particle. Thus, the crystallite diameter D1 can be referred to as the particle diameter of the primary particle. In ruthenium oxide ($RuO_2$) having a rutile crystal structure, among the diffraction peaks, the diffraction peaks of the (110), (101), (211), (301), and (321) planes of the crystal structure are relatively large. However, in the ruthenium oxide powder according to the present embodiment, the crystallite diameter calculated from the peak of the (110) plane where the relative intensity is the highest and that is suitable for the measurement, can be set as 25 nm or more and 80 nm or less as described above.

When the crystallite diameter of the ruthenium oxide powder according to the present embodiment is 25 nm or more, the crystal is sufficiently grown, and, therefore, when this ruthenium oxide powder is used as a raw material for the thick film resistor, this ruthenium oxide powder is considered to have excellent crystallinity. By using this ruthenium oxide powder having excellent crystallinity as a raw material of the thick film resistor, for example, when the thick film resistor paste is fired, the reaction between the ruthenium oxide powder and the glass can be suppressed. Therefore, it is possible to suppress a conduction path having semiconductive conductivity caused by a reaction between ruthenium oxide particles and glass, and the resistance temperature coefficient is unlikely to become negative.

However, it is preferable that the crystallite diameter of the ruthenium oxide powder according to the present embodiment be 80 nm or less as described above. This is because by making the crystallite diameter of the ruthenium oxide powder according to the present embodiment to be 80 nm or less, the number of conduction paths can be increased and the electrical characteristics with respect to noise can be improved.

On the other hand, as the particle diameter of ruthenium oxide powder becomes smaller, the specific surface area increases. Assuming that the particle diameter of ruthenium oxide powder is D2 (nm), the density is ρ ($g/cm^3$), and the specific surface area is S ($m^2/g$), and that each particle of the powder is a sphere, the relation indicated in formula (3) below is established. The particle diameter calculated by this D2 is defined as the specific surface area diameter.

$$D2\ (nm)=6\times10^3/(\rho\cdot S) \qquad (3)$$

In the present embodiment, the specific surface area diameter calculated by formula (3) can be 25 nm or more and 114 nm or less, with the density of the ruthenium oxide being 7.05 $g/cm^3$.

This is because, by making the specific surface area diameter D2 to be 25 nm or more, when the thick film resistor paste containing the ruthenium oxide powder and the glass powder is fired to manufacture the thick film resistor using the ruthenium oxide powder, it is possible to suppress the reaction between the ruthenium oxide powder and the glass powder from proceeding excessively. As described above, in the reaction phase between ruthenium oxide powder and glass powder, the resistance temperature coefficient becomes negative. If the reaction between the ruthenium oxide powder and the glass powder progresses excessively and the ratio of the reaction phase increases, the resistance temperature coefficient of the obtained thick film resistor may become significantly negative.

However, if the specific surface area diameter of the ruthenium oxide powder becomes excessively large, the contact points between the particles of ruthenium oxide, which are conductive particles, become small. Therefore, there is a risk that the number of conductive paths is reduced and a sufficient level of electrical characteristics with respect to noise cannot be obtained. Therefore, it is preferable that the specific surface area diameter D2 be 114 nm or less.

As described above, it is preferable that the ratio of the crystallite diameter D1 to the specific surface area diameter D2 in the ruthenium oxide powder according to the present embodiment satisfies the relationship of $0.70 \leq D1/D2 \leq 1.00$.

When the ruthenium oxide powder is polycrystalline or when particles with a small crystallite diameter are connected, the specific surface area diameter D2 becomes larger than the crystallite diameter D1, and the ratio of D1 to D2, i.e., D1/D2, becomes less than 1.00.

Further, when D1/D2 is less than 0.70, in the thick film resistor obtained by firing the thick film resistor paste, the number of conductive paths is reduced and tends to become non-uniform by the coarsened ruthenium oxide or the connected ruthenium oxide, and the electrical characteristics with respect to noise are not good.

Therefore, the value of D1/D2 is used as a rough standard for the crystalline perfection of particles, and it can be determined that the smaller the D1/D2, the lower the perfection of the crystal in which the particles are formed, and the larger the D1/D2, the higher the crystalline perfection. In general, as the powder becomes finer, the perfection of the crystals forming the particles tends to decrease and the D1/D2 value tends to decrease.

The ruthenium oxide powder according to the present embodiment has high crystallinity and is close to a single crystal, and, therefore, it is preferable that the lower limit of the suitable range of D1/D2 be 0.70, as described above.

As described above, the value of D1/D2 is a rough standard of the crystalline perfection of particles, and when the ruthenium oxide powder is a single crystal, this value approaches 1.00, and conversely, as the crystallinity of each particle in ruthenium oxide powder decreases, the value of D1/D2 becomes smaller than 1.00. If the particle diameter distribution of the particles included in the ruthenium oxide powder is relatively uniform, the value of D1/D2 will not exceed 1.00, but if particles having particle diameters that are significantly different from each other are mixed, the value of D1/D2 will be greater than 1.00. This is considered to be because the specific surface area is the surface area per gram of powder and varies gently depending on the particle diameter distribution, whereas the sharpness of the X-ray diffraction peak is strongly influenced by particles of large diameters. When D1/D2 exceeds 1.00, even if the crystallite diameter is measured to be large, it is considered that many particles having a small crystallite diameter are actually included.

As described above, it is preferable that the upper limit of the suitable range of D1/D2 be 1.00, because it is preferable that the ruthenium oxide powder according to the present embodiment has high crystallinity and is free of connected particles.

A ruthenium oxide powder for a thick film resistor is generally manufactured by heat treating a hydrated ruthenium oxide powder synthesized by a wet process, and the particle diameter and crystallinity vary depending on the synthesis method and the conditions of the heat treatment. Therefore, by adjusting the conditions at the time of manufacturing, the ruthenium oxide powder according to the present embodiment can be manufactured.

The thick film resistor using the ruthenium oxide powder according to the present embodiment described above has a high area resistance value and can have a resistance temperature coefficient close to zero.

Note that, as described above, the resistance temperature coefficient of the thick film resistor using the ruthenium oxide powder according to the present embodiment is close to zero and tends to be positive. The reason for this is considered to be that when firing the thick film resistor paste in order to manufacture the thick film resistor, the reaction between the particles of the ruthenium oxide powder, which includes conductive particles, and the glass powder, does not excessively proceed, and thus the ratio of the semiconductive conductivity is reduced.

As described below, a thick film resistor composition including the ruthenium oxide powder according to the present embodiment and glass powder can be used to manufacture a thick film resistor. The resistor composition may include any component in addition to the ruthenium oxide powder and the glass powder, but may be formed only of the ruthenium oxide powder and the glass powder.

Even in a case where a thick film resistor having a resistor width and a resistor length of 1.0 mm and a film thickness of 7 μm obtained by using a thick film resistor composition containing no additives, etc., in which only the ruthenium oxide powder according to the present embodiment and glass powder are combined and in which the compound ratio (content ratio) of the ruthenium oxide powder is reduced so that the resistance value of the thick film resistor is higher than 80 kΩ ($8\times10^4$Ω), the resistance temperature coefficient (COLD-TCR and HOT-TCR) can be in a range of −100 ppm/° C. or more and +100 ppm/° C. or less that is close to zero. Further, in this case, it is possible to obtain a thick film resistor with excellent electrical characteristics with respect to noise and withstand voltage characteristics. Note that the resistance value of the thick film resistor is typically evaluated by the area resistance value where the ratio of the resistor width to the resistor length is 1:1 as described above.

As described above, by using a ruthenium oxide powder according to the present embodiment in which the crystallite diameter, the specific surface area diameter, and the ratio of the crystallite diameter to the specific surface area diameter are within a predetermined range, it is possible to manufacture and realize a thick film resistor having a resistance temperature coefficient close to zero and good characteristics with respect to noise. Further, with the ruthenium oxide powder according to the present embodiment, it is possible to form a thick film resistor having a low compound ratio (content ratio) of the ruthenium oxide powder as described above, and having a resistance temperature coefficient close to zero even in the high resistance value range (high electrical resistivity range), and having excellent electrical characteristics with respect to noise. Thus, the ruthenium oxide powder according to the present embodiment can also be a material in place of lead ruthenate ($Pb_2Ru_2O_{6.5}$) powder.

In the thick film resistor composition using the ruthenium oxide powder according to the present embodiment, even without additives or the like, a thick film resistor having a resistance temperature coefficient close to zero and excellent electrical characteristics with respect to noise can be formed. Therefore, when an additive described below is added to the thick film resistor composition using the ruthenium oxide powder according to the present embodiment, it is a matter of course that the thick film resistor composition will have excellent electrical characteristics. Further, the thick film resistor composition using the ruthenium oxide powder according to the present embodiment can form a thick film resistor having a resistance temperature coefficient that is close to zero and having excellent electrical characteristics with respect to noise even without any additives, and, therefore, it can be said that this material has a high degree of freedom in adjusting the electrical characteristics of the thick film resistor by adding additives.

Note that by using the ruthenium oxide powder according to the present embodiment, it is possible to manufacture a thick film resistor having a resistance temperature coefficient close to zero and having excellent electrical characteristics with respect to noise, not only in the high resistance value range but also in the low resistance value range.

2. Method for Manufacturing Ruthenium Oxide Powder

Next, an example of a method for manufacturing the ruthenium oxide powder according to the present embodiment will be described.

Note that the above-described ruthenium oxide powder can be manufactured by the method for manufacturing the ruthenium oxide powder according to the present embodiment, and, therefore, part of the matters described above will be omitted.

The method for manufacturing the ruthenium oxide powder according to the present embodiment is not particularly limited, as long as the manufacturing method used produces the ruthenium oxide powder described above.

As the method for manufacturing the ruthenium oxide powder according to the present embodiment, for example, a method for manufacturing the ruthenium oxide powder by heat treating a ruthenium oxide hydrate synthesized by a wet process is preferable. In such a manufacturing method, the specific surface area diameter or the crystallite diameter can be changed depending on the synthesis method or the conditions of the heat treatment, etc.

That is, the method for manufacturing the ruthenium oxide powder according to the present embodiment can include, for example, the following steps.

A ruthenium oxide hydrate generating step of synthesizing a ruthenium oxide hydrate by a wet process.

A ruthenium oxide hydrate collecting step of separating and collecting the ruthenium oxide hydrate in solution.

A drying step of drying the ruthenium oxide hydrate. A heat treatment step of performing heat treatment on the ruthenium oxide hydrate.

Note that by the method for manufacturing a ruthenium oxide powder generally used in the conventional technology, in which a ruthenium oxide having a large particle diameter is manufactured and then the ruthenium oxide is crushed, it is difficult to reduce the particle diameter and the variations in particle diameters is large, and, therefore, such a method is not suitable as a method for manufacturing the ruthenium oxide powder according to the present embodiment.

In the ruthenium oxide hydrate generating step, the method of synthesizing the ruthenium oxide hydrate is not particularly limited; however, for example, there is a method of precipitating the ruthenium oxide hydrate in an aqueous solution containing ruthenium. Specifically, for example, there is a method of adding ethanol to an aqueous solution of $K_2RuO_4$ to precipitate a ruthenium oxide hydrate or a method of neutralizing an aqueous solution of $RuCl_3$ with KOH, etc., to precipitate a ruthenium oxide hydrate.

Then, as described above, by the ruthenium oxide hydrate collecting step and the drying step, the precipitate of the ruthenium oxide hydrate is subjected to solid-liquid separation, washed as necessary, and then dried, to thereby obtain a powder of the ruthenium oxide hydrate.

The conditions of the heat treatment step are not particularly limited. For example, the ruthenium oxide hydrate powder can be heat treated at a temperature of 400° C. or higher under an oxidizing atmosphere to remove water of crystallization, thus forming a highly crystalline ruthenium oxide powder. Here, the oxidizing atmosphere is a gas including greater than or equal to 10% by volume of oxygen, and for example, air may be used.

It is preferable that the temperature when heat-treating the ruthenium oxide hydrate powder is 400° C. or higher as described above, so that a ruthenium oxide ($RuO_2$) powder having excellent crystallinity can be obtained. The upper limit of the heat treatment temperature is not particularly limited. However, if the temperature is excessively high, the crystallite diameter and the specific surface area diameter of the obtained ruthenium oxide powder may be too large, or the rate of ruthenium becoming hexavalent or octavalent oxides ($RuO_3$ or $RuO_4$) and volatilizing may be high. Therefore, it is preferable that the heat treatment be performed at a temperature of, for example, 1000° C. or less.

In particular, it is more preferable that the temperature at which the ruthenium oxide hydrate powder is heat treated be 500° C. or more and 1000° C. or less.

As described above, the specific surface area diameter and the crystallinity of the obtained ruthenium oxide powder can be changed depending on the synthesis conditions and the heat treatment conditions and the like, when manufacturing the ruthenium oxide hydrate. Therefore, it is preferable to select the conditions so that a ruthenium oxide powder having the desired crystallite diameter and specific surface area diameter can be obtained, for example, by performing preliminary tests.

The method for manufacturing the ruthenium oxide powder according to the present embodiment may include steps other than those described above.

As described above, the precipitate of the ruthenium oxide hydrate can be subjected to solid-liquid separation in the ruthenium oxide hydrate collecting step, dried in the drying step, and subsequently, before the heat treatment step, the obtained ruthenium oxide hydrate can be mechanically crushed to obtain a crushed ruthenium oxide hydrate powder (crushing step).

When the crushed ruthenium oxide hydrate powder is subjected to a heat treatment step at a temperature of 400° C. or more under an oxidizing atmosphere, water of crystallization is removed as described above and the crystallinity of the ruthenium oxide powder can be improved. As described above, by performing the crushing step, it is possible to suppress and reduce the degree of aggregation of the ruthenium oxide hydrate powder to be subjected to the heat treatment step. Also, by performing heat treatment on the ruthenium oxide hydrate powder subjected to crushing, it is possible to suppress the formation of coarse particles and connected particles that would be caused by heat treatment. Thus, also by selecting the conditions of the crushing step, it is possible to obtain a ruthenium oxide powder having a desired crystallite diameter or specific surface area diameter.

The crushing conditions of the crushing step are not particularly limited, and it is possible to select conditions by performing a preliminary test or the like, so that the desired ruthenium oxide powder can be obtained.

Further, the method for manufacturing the ruthenium oxide powder according to the present embodiment can also include classifying the obtained ruthenium oxide powder after the heat treatment step (classifying step). By performing the classifying step in this manner, it is possible to selectively collect the ruthenium oxide powder having a desired specific surface area diameter.

3. Thick Film Resistor Composition

Next, a configuration example of a thick film resistor composition according to the present embodiment will be described.

The thick film resistor composition according to the present embodiment can include the aforementioned ruthenium oxide powder, which includes conductive particles, and the glass powder.

The thick film resistor composition according to the present embodiment contains the aforementioned ruthenium oxide powder, which is a conductive component, and, therefore, by using the thick film resistor composition, it is possible to obtain a thick film resistor with a resistance temperature coefficient close to zero and having excellent electrical characteristics.

The components contained in the thick film resistor composition according to the present embodiment will be described.

The ruthenium oxide powder has already been described, and, therefore, descriptions thereof will be omitted here.

With respect to the glass powder, the composition and manufacturing method are not particularly limited.

As the glass powder used in the thick film resistor composition, lead alumino-borosilicate containing lead is often used, but other lead-free composition systems such as the zinc borosilicate system, the calcium borosilicate system, and the barium borosilicate system are also used. In recent years, from the viewpoint of environmental protection, it is desirable to use lead-free glass.

As described above, as the glass of the glass powder, for example, one or more kinds selected from lead alumino-borosilicate glass, borosilicate zinc-based glass, borosilicate calcium-based glass, and borosilicate barium-based glass can be used. Further, lead-free glass, for example, one or more kinds selected from a borosilicate zinc-based glass, a borosilicate calcium-based glass, and a borosilicate barium-based glass may be used.

Glass can generally be manufactured by mixing predetermined components or precursors thereof by the desired composition, and melting and quenching the obtained mixture. The melting temperature is not particularly limited, but is approximately 1400° C., for example. Further, the quenching is often performed by placing the molten material in cold water or pouring the molten material onto a cold belt. The glass is crushed to a desired particle size in a ball mill, a vibration mill, a planetary mill, or a bead mill.

Although the particle diameter of the glass powder is not limited, it is preferable that the 50% volume cumulative particle size measured by a particle size distribution meter using laser diffraction be 5 μm or less, and more preferably 3 μm or less. When the particle size of the glass powder is too large, the area resistance value of the fired thick film resistor decreases, but there is a high possibility that problems occur in that the variation of the area resistance value increases and the yield decreases, and the load characteristic decreases. Therefore, from the viewpoint of sufficiently increasing the yield and improving the load characteristics, it is preferable that the 50% volume cumulative particle size of the glass particles to be used be 5 μm or less.

Note that if the particle size of the glass powder is too small, the productivity may decrease and contamination of impurities, etc., may increase, and, therefore, it is preferable that the 50% volume cumulative particle size of the glass powder be 0.5 μm or more.

The mixture ratio of the ruthenium oxide powder and the glass powder in the thick film resistor composition according to the present embodiment can be varied arbitrarily depending on the desired area resistance value, and is not particularly limited. That is, when a high resistance value is desired, the compounded ruthenium oxide powder may be reduced, and when a low resistance value is desired, the compounded ruthenium oxide powder may be increased.

For example, it is preferable that ruthenium oxide ($RuO_2$) powder:glass powder is in a range of 5:95 to 50:50. That is, it is preferable that the ratio of the ruthenium oxide powder with respect to the ruthenium oxide powder and the glass powder be 5% by mass or more and 50% by mass or less.

This is because when the ratio of the ruthenium oxide powder is below 5% by mass with respect to the ruthenium oxide powder and the glass powder in the thick film resistor composition according to the present embodiment, that is, assuming that the total mass of the ruthenium oxide powder and the glass powder is 100% by mass, the resistance value of the obtained thick film resistor may be too high and unstable.

Further, when the ratio of the ruthenium oxide powder is 50% by mass or less with respect to the ruthenium oxide powder and the glass powder in the thick film resistor composition according to the present embodiment, the strength of the obtained thick film resistor can be sufficiently increased, and particularly, brittleness can be reliably prevented.

Note that it is preferable that the mixture ratio of the ruthenium oxide powder and the glass powder in the thick film resistor composition according to the present embodiment be in the range of ruthenium oxide powder:glass powder=5:95 to 40:60. That is, it is more preferable that the ratio of the ruthenium oxide powder be 5% by mass or more and 40% by mass or less with respect to the ruthenium oxide powder and the glass powder.

It is preferable that the thick film resistor composition according to the present embodiment includes the aforementioned ruthenium oxide powder and the glass powder as the main components, but may be formed only of the ruthenium oxide powder and the glass powder. The thick film resistor composition according to the present embodiment preferably contains a mixed powder of the aforementioned ruthenium oxide powder and the glass powder at a ratio of, for example, 80% by mass or more and 100% by mass or less, and more preferably at a ratio of 85% by mass or more and 100% by mass or less.

The thick film resistor composition according to the present embodiment may further contain any component as needed.

The thick film resistor composition according to the present embodiment may include, for example, conductive particles other than the ruthenium oxide powder. Examples of these conductive particles include one or more kinds selected from an oxide containing ruthenium such as lead ruthenate having a pyrochlore crystalline structure, bismuth ruthenium acid, calcium ruthenium acid having a perovskite crystalline structure, strontium ruthenium acid, barium ruthenium acid, lanthanum ruthenium acid, and the like, silver (Ag), palladium (Pd), and the like.

The thick film resistor composition according to the present embodiment may include additives for the purpose of adjusting the area resistance value and the resistance temperature coefficient, for adjusting the coefficient of expansion, for improving the withstand voltage characteristics, and other modifications, in addition to the ruthenium oxide powder and the glass powder. Examples of additives of the thick film resistor composition include one or more kinds selected from $MnO_2$, CuO, $TiO_2$, $Nb_2O_5$, $Ta_2O_5$, $SiO_2$, $Al_2O_3$, $ZrO_2$, $ZrSiO_4$, and the like. Further, when the thick film resistor composition according to the present embodiment contains the additive described above, the ratio of the additive is not particularly limited; however, for example, the additive may be added so as to be 0.05% by mass or more and 20% by mass or less, with respect to the total weight of the ruthenium oxide powder and the glass powder.

4. Thick Film Resistor Paste

Next, a configuration example of the thick film resistor paste according to the present embodiment will be described.

The thick film resistor paste according to the present embodiment can have a configuration in which the aforementioned thick film resistor composition is dispersed in an organic vehicle.

As described above, the thick film resistor paste according to the present embodiment can be formed by dispersing the aforementioned thick film resistor composition in a solvent in which a resin component is dissolved, referred to as an organic vehicle.

The types and compounds of the resin and the solvent of the organic vehicle are not particularly limited. As the resin component of the organic vehicle, one or more kinds selected from, for example, ethyl cellulose, maleic acid resin, rosin, or the like can be used.

As the solvent, for example, one or more kinds selected from terpineol, butyl carbitol, and butyl carbitol acetate or the like may be used. Further, a solvent having a high boiling point may be added in order to delay the drying of the thick film resistor paste.

The composition ratio of the resin component and the solvent can be adjusted depending on the viscosity, etc., required of the resulting thick film resistor paste. The ratio of the organic vehicle to the thick film resistor composition is not particularly limited; however, when the thick film resistor composition is 100 parts by mass (100% by mass), the ratio of the organic vehicle may be, for example, 30% by mass or more and 100% by mass or less. That is, the organic vehicle may be compounded at a ratio of 30 parts by mass or more to 100 parts by mass or less, with respect to 100 parts by mass of the thick film resistor composition.

The method for manufacturing the thick film resistor paste according to the present embodiment is not particularly limited; however, for example, one or more kinds selected from a three-roll mill, a planetary mill, a bead mill, or the like can be used to disperse the aforementioned thick film resistor composition in an organic vehicle. For example, the aforementioned thick film resistor composition may be mixed in a ball mill or crushing machine and then dispersed in an organic vehicle.

In manufacturing the thick film resistor paste, it is desirable to dissolve the agglomeration of the inorganic raw material powder and disperse the powder in a solvent in which the resin component is dissolved, that is, an organic vehicle. Generally, the agglomeration becomes greater and the formation of secondary particles becomes easier, as the particle diameter of the powder becomes smaller. Therefore, in the thick film resistor paste according to the present embodiment, fatty acids or the like can be added as a dispersant to facilitate dissociation of the secondary particles and the dispersion in the primary particles.

5. Thick Film Resistor

Next, a configuration example of the thick film resistor according to the present embodiment will be described.

The thick film resistor according to the present embodiment can be manufactured by using the aforementioned thick film resistor composition and the thick film resistor paste. Thus, the thick film resistor according to the present embodiment can contain the aforementioned ruthenium oxide powder and a glass component.

As described above, in the thick film resistor composition, it is preferable that the ratio of the ruthenium oxide powder is 5% by mass or more and 50% by mass or less, with respect to the ruthenium oxide powder and the glass powder. The thick film resistor according to the present embodiment can be manufactured by using the thick film resistor composition, and the glass component in the obtained thick film resistor is derived from the glass powder of the thick film resistor composition. Therefore, in the thick film resistor according to the present embodiment, it is preferable that the ratio of the ruthenium oxide powder is 5% by mass or more and 50% by mass or less, more preferably 5% by mass or more and 40% by mass or less, with respect to the ruthenium oxide powder and the glass component, similar to the thick film resistor composition according to the present embodiment.

The method for manufacturing the thick film resistor according to the present embodiment is not particularly limited, but for example, the aforementioned thick film resistor composition can be fired on a ceramic substrate to form the thick film resistor. Further, the aforementioned thick film resistor paste may be applied to the ceramic substrate and then fired, to form the thick film resistor.

PRACTICAL EXAMPLES

Although specific practical examples and comparison examples will be described below, the present invention is not limited to these practical examples.
(Evaluation Method)

First, the method for evaluating the obtained ruthenium oxide powder will be described in the following practical examples and comparison examples.

1. Evaluation of Ruthenium Oxide Powder

In order to evaluate the shape and physical characteristics of the obtained ruthenium oxide powder, the substance identification and the crystallite diameter calculation were performed by the X-ray diffraction method and the specific surface area diameter was calculated by the BET method.

The crystallite diameter can be calculated from the spread of the peak of the X-ray diffraction pattern. Here, after the peak of the rutile structure obtained by X-ray diffraction, was separated into the waveforms of $K\alpha 1$ and $K\alpha 2$, the half-value width was measured by obtaining the spread of the peak of $K\alpha 1$ for which the spread caused by the optical system of the measuring instrument has been corrected, and the crystallite diameter was calculated by the Scherrer equation.

Specifically, when the crystallite diameter is D1 (nm), the wavelength of the X-ray is $\lambda$ (nm), the spread of the diffraction line profile at the (110) plane is $\beta$, and the diffraction angle is $\theta$, the crystallite diameter is calculated from the Scherrer equation indicated as the following formula (2).

$$D1\ (nm) = (K \cdot \lambda)/(\beta \cdot \cos \theta) \quad (2)$$

In formula (2), K is a Scherrer constant, and 0.9 can be used.

The specific surface area diameter can be calculated from the specific surface area and the density. The BET1 point method was used for measuring the specific surface area, by which the specific surface area can be easily measured. Assuming that the specific surface area diameter is D2 (nm), the density is $\rho$ (g/cm$^3$), and the specific surface area is S (m$^2$/g), and that each particle of the powder is a sphere, the relation indicated in formula (3) below is established. The particle diameter calculated by this D2 is defined as the specific surface area diameter.

$$D2\ (nm) = 6 \times 10^3/(\rho \cdot S) \quad (3)$$

In the present embodiment, the density of ruthenium oxide was 7.05 g/cm$^3$.

2. Evaluation of Thick Film Resistor

The obtained thick film resistor was evaluated in terms of the film thickness, the resistance value, the resistance temperature coefficient with respect to a temperature from 25° C. to −55° C. (COLD-TCR), the resistance temperature coefficient respect to a temperature from 25° C. to 125° C. (HOT-TCR), and the current noise as a representative electrical characteristic.

The film thickness was calculated with respect to five thick film resistors manufactured in the same manner for the respective practical examples and comparison examples, by measuring the film thickness by using a thickness/roughness gauge including a sensing pin (model number: SurfCom 480B, manufactured by TOKYO SEIMITSU CO., LTD), and averaging the measured value.

The resistance value was calculated with respect to 25 thick film resistors manufactured in the same manner for the respective practical examples and comparison examples, by measuring the resistance value with a digital multimeter (no. 2001, manufactured by Keithley Instruments), and averaging the measured resistance values.

In measuring the resistance temperature coefficient, the resistance value was obtained by holding each of five thick film resistors manufactured in the same manner for the respective practical examples and comparison examples in a temperature of −55° C., 25° C., and 125° C. for 15 minutes, respectively, and then measuring the respective resistance values, thereby obtaining a resistance value $R_{-55}$ at −55° C., a resistance value $R_{25}$ at 25° C., and a resistance value $R_{125}$ at 125° C. Then, the resistance temperature coefficient in each temperature range was calculated for each thick film resistor according to the following formulas (4) and (5). Then, with respect to the calculated resistance temperature coefficient in each temperature range, the average value of the five thick film resistors was calculated, thereby obtaining the resistance temperature coefficients (COLD-TCR, HOT-TCR) in the respective temperature ranges for the thick film resistors obtained the respective practical examples and comparison examples. These values are expressed in units of ppm/° C.

$$\text{COLD-TCR} = (R_{-55} - R_{25})/R_{25}/(-80) \times 10^6 \quad (4)$$

$$\text{HOT-TCR} = (R_{125} - R_{25})/R_{25}/(100) \times 10^6 \quad (5)$$

The current noise was calculated by expressing the current noise, which was measured by applying a voltage of ⅒ W by RCN-2011 manufactured by Noise Laboratory Co., Ltd., as a noise index, and averaging the noise index with respect to five thick film resistors manufactured in the same manner for the respective practical examples and comparison examples. The lower the current noise becomes, the better the noise characteristic becomes. Excellent noise characteristics are also correlated with electrical characteristics such as the withstand voltage characteristic, and when noise characteristics are excellent, it is possible to realize a thick film resistor with excellent electrical characteristics as well.

Practical Examples 1 to 4

An aqueous solution, in which potassium ruthenium acid was dissolved, was used as a raw material, ethanol was added, and the ruthenium oxide was synthesized in the aqueous solution and precipitated (ruthenium oxide hydrate generating step).

Then, solid-liquid separation was performed, and the obtained ruthenium oxide hydrate was separated and collected (ruthenium oxide hydrate collecting step).

The separated and collected ruthenium oxide hydrate was washed and then dried in an atmosphere of 80° C., thereby obtaining a ruthenium oxide powder (drying step). The ruthenium oxide after drying was a ruthenium oxide hydrate with almost no crystallinity.

A crushing process was performed, in which the dried ruthenium oxide hydrate was crushed by a ball mill (crushing step), and a heating process was performed by holding the crushed ruthenium oxide hydrate in an atmosphere having the temperature indicated in Table 1 for a period of time indicated in Table 1 (heat treatment step), whereby a ruthenium oxide ($RuO_2$) powder was obtained.

With respect to the crushing process, a preliminary test was performed to set the crushing conditions in advance so that the crystallite diameter D1 and the specific surface area diameter D2 of the obtained ruthenium oxide powder become desired values.

The obtained ruthenium oxide powder was mixed with a glass powder having a 50% volume cumulative particle size of 1.5 μm measured by a particle size distribution meter using laser diffraction, so as to obtain a composition indicated in Table 1, thereby manufacturing a thick film resistor composition. At this time, as the glass powder, the glass powder A having the composition indicated in Table 2 was used. The glass powder A had a glass transition point of 620° C. and a softening point of 760° C.

The glass transition point was determined to be a temperature indicating the bending point of a thermal expansion curve, measured by heating a rod-like sample, which is obtained by re-melting the glass powder, etc., by raising the temperature 10° C. per minute in the atmosphere, by thermomechanical analysis (TMA). The softening point was determined by heating the glass powder by raising the temperature 10° C. per minute in the atmosphere, by differential thermal analysis (TG-DTA), obtaining a differential thermal curve, and determining, as the softening point, the peak temperature at which the next differential thermal curve decreased, on the higher temperature side in comparison with the temperature at which the decrease of the differential thermal curve on the lowest temperature side of the obtained differential thermal curve occurred. The composition of the ruthenium oxide powder and the glass powder was adjusted to be the ratio indicated in Table 1, so that the area resistance value of the formed thick film resistor was approximately 100 kΩ.

The obtained thick film resistor composition was added to an organic vehicle and a three-roll mill was used to disperse the thick film resistor composition in the organic vehicle. At this time, the thick film resistor composition was added and mixed (dispersed) so that the ratio of the organic vehicle became 43% by mass, when the total of the ruthenium oxide powder and the glass powder was 100 parts by weight.

As an organic vehicle, a mixture of 5% by mass to 25% by mass of ethyl cellulose and 75% by mass to 95% by mass of terpineol was used. The ratios of the above components in the organic vehicle were adjusted within the above-described ranges, so that the viscosity of the thick film resistor paste of practical examples 1 to 4 was substantially the same value.

Then, the obtained thick film resistor paste was printed, dried, and fired on an alumina substrate having a purity of 96% by mass, to form a thick film resistor, and the thick film resistor was evaluated.

Specifically, the thick film resistor was formed by printing the obtained thick film resistor paste on an electrode formed by being fired on an alumina substrate in advance, and heating the thick film resistor paste at 150° C. for 5 minutes to dry. Note that the electrode is formed of a Pd—Ag alloy consisting of 1% by mass of Pd and 99% by mass of Ag. Then, the thick film resistor paste was fired for a total of 30 minutes, including before and after the temperature rise and the cooling time, with the peak temperature being 850° C. and the holding time at the peak temperature being 9 minutes, thereby forming a thick film resistor. The size of the thick film resistor was 1.0 mm in width and 1.0 mm in length. The evaluation results are indicated in Table 1.

Note that in order to clarify the effect caused by the ruthenium oxide ($RuO_2$) powder, the thick film resistor paste is composed of the ruthenium oxide ($RuO_2$) powder, the glass powder A, and the organic vehicle as described above.

TABLE 1

|  |  |  |  | PRACTICAL EXAMPLE 1 | PRACTICAL EXAMPLE 2 | PRACTICAL EXAMPLE 3 | PRACTICAL EXAMPLE 4 |
|---|---|---|---|---|---|---|---|
| MANUFACTURING CONDITION OF RUTHENIUM OXIDE POWDER | WHETHER CRUSHING STEP IS PERFORMED |  |  | PERFORMED | PERFORMED | PERFORMED | PERFORMED |
|  | CONDITIONS OF HEAT TREATMENT STEP | TEMPERATURE | (° C.) | 650 | 800 | 850 | 900 |
|  |  | TIME | (min) | 180 | 120 | 120 | 120 |
| EVALUATION RESULTS OF RUTHENIUM OXIDE | CRYSTALLITE DIAMETER CALCULATED FROM PEAK OF (110) PLANE: D1 |  | (nm) | 27 | 46 | 71 | 78 |

TABLE 1-continued

|  |  |  |  |  |  |  |
|---|---|---|---|---|---|---|
| POWDER | SPECIFIC SURFACE AREA DIAMETER: D2 | (nm) | 30 | 46 | 73 | 104 |
|  | D1/D2 |  | 0.90 | 1.00 | 0.97 | 0.75 |
| COMPOSITION OF THICK FILM RESISTOR COMPOSITION | RUTHENUIUM OXIDE POWDER | (pts. mass) | 11 | 14 | 17 | 18 |
|  | GLASS POWDER | (pts. mass) | 89 | 86 | 83 | 82 |
| ELAVUATION RESULTS OF THICK FILM RESISTOR COMPOSITION | FILM THICKNESS | (μm) | 7.9 | 7.8 | 7.1 | 7.0 |
|  | AREA RESISTANCE VALUE | (Ω) | 105 k | 98 k | 98 k | 103 k |
|  | COLD-TCR | (ppm/° C.) | −70 | 0 | 43 | 66 |
|  | HOT-TCR | (ppm/° C.) | −30 | 23 | 56 | 75 |
|  | CURRENT NOISE | (dB) | −2 | 0 | 3 | 4 |

|  |  |  | COMPARISON EXAMPLE 1 | COMPARISON EXAMPLE 2 | COMPARISON EXAMPLE 3 | COMPARISON EXAMPLE 4 |
|---|---|---|---|---|---|---|
| MANUFACTURING CONDITION OF RUTHENIUM OXIDE POWDER | WHETHER CRUSHING STEP IS PERFORMED |  | NOT PERFORMED | NOT PERFORMED | NOT PERFORMED | NOT PERFORMED |
|  | CONDITIONS OF HEAT TREATMENT STEP — TEMPERATURE | (° C.) | 700 | 750 | 850 | 900 |
|  | CONDITIONS OF HEAT TREATMENT STEP — TIME | (min) | 120 | 120 | 120 | 120 |
| EVALUATION RESULTS OF RUTHENIUM OXIDE POWDER | CRYSTALLITE DIAMETER CALCULATED FROM PEAK OF (110) PLANE: D1 | (nm) | 20 | 28 | 80 | 99 |
|  | SPECIFIC SURFACE AREA DIAMETER: D2 | (nm) | 21 | 44 | 56 | 118 |
|  | D1/D2 |  | 0.95 | 0.64 | 1.42 | 0.83 |
| COMPOSITION OF THICK FILM RESISTOR COMPOSITION | RUTHENUIUM OXIDE POWDER | (pts. mass) | 10 | 17 | 13 | 24 |
|  | GLASS POWDER | (pts. mass) | 90 | 83 | 87 | 76 |
| ELAVUATION RESULTS OF THICK FILM RESISTOR COMPOSITION | FILM THICKNESS | (μm) | 7.0 | 7.0 | 7.0 | 7.0 |
|  | AREA RESISTANCE VALUE | (Ω) | 90 k | 103 k | 105 k | 110 k |
|  | COLD-TCR | (ppm/° C.) | −256 | 75 | −203 | 85 |
|  | HOT-TCR | (ppm/° C.) | −138 | 78 | −109 | 84 |
|  | CURRENT NOISE | (dB) | −5 | 20 | 0 | 19 |

TABLE 2

|  | CONTENT RATIO (mass %) |
|---|---|
| $SiO_2$ | 40 |
| $B_2O_3$ | 15 |
| $Al_2O_3$ | 5 |
| CaO | 8 |
| BaO | 30 |
| MgO | 0.5 |
| $K_2O$ | 1 |
| $Li_2O$ | 0.5 |

As is apparent from the results indicated in Table 1, in practical examples 1 to 4, it was confirmed that the resistance temperature coefficient was in the range of −100 ppm/° C. or more and +100 ppm/° C. or less even near the area resistance value of approximately 100 kΩ, and the current noise was sufficiently low. That is, it was confirmed that a thick film resistor having a resistive temperature coefficient close to zero and having excellent electrical characteristics, was obtained.

Further, as a tendency throughout practical examples 1 to 4, as the crystallite diameter D1 increased, the resistance temperature coefficient was inclined toward the positive side, and the noise tended to increase slightly.

Comparison Examples 1 to 5

As in practical examples 1 to 4, an aqueous solution, in which potassium ruthenium acid was dissolved, was used as a raw material, ethanol was added, and the ruthenium oxide was synthesized in the aqueous solution and precipitated (ruthenium oxide hydrate generating step).

Then, solid-liquid separation was performed, and the obtained ruthenium oxide hydrate was separated and collected (ruthenium oxide hydrate collecting step).

The separated and collected ruthenium oxide hydrate was washed and then dried in an atmosphere of 80° C., thereby obtaining a ruthenium oxide powder (drying step). The ruthenium oxide after drying was a ruthenium oxide hydrate with almost no crystallinity.

As indicated in Table 1, the crushing process was not performed except for comparison example 1, and a heating process was performed by holding the ruthenium oxide hydrate in an atmosphere having the temperature indicated in Table 1 for a period of time indicated in Table 1 (heat treatment step), whereby a ruthenium oxide ($RuO_2$) powder was obtained.

Thereafter, as was done in the case of practical examples 1 to 4, a thick film resistor composition and a thick film resistor paste were manufactured, and a thick film resistor was formed and evaluated.

Note that in comparison examples 1 to 4, when manufacturing the thick film resistor composition, the glass powder A was used. The composition of the ruthenium oxide powder and the glass powder was adjusted to be the ratio indicated in Table 1, so that the area resistance value of the formed thick film resistor was approximately 100 kΩ.

Table 1 indicates the evaluation results.

Comparison example 1 is an example using the ruthenium oxide powder in which the crystallite diameter D1 and the specific surface area diameter D2 are both less than 25 nm. According to the evaluation results of the thick film resistor manufactured in comparison example 1, it was confirmed that the current noise was small, but the resistance temperature coefficients were largely on the negative side.

Comparison example 2 is an example in which the crystallinity is low and the ratio D1/D2 of the crystallite diameter D1 to the specific surface area diameter D2 is lower than 0.70. It was confirmed that the resistance temperature coefficients were in the range of −100 ppm/° C. or more and +100 ppm/° C. or less, but the current noise was high.

In comparison example 3, because coarse particles and fine particles are mixed, the ratio D1/D2 of the crystallite diameter D1 to the specific surface area diameter D2 exceeds 1.00. It was confirmed that although the current noise was small, the resistance temperature coefficients were largely on the negative side.

Comparison example 4 is an example using the ruthenium oxide powder with a crystallite diameter D1 greater than 80 nm and a specific surface area diameter D2 greater than 114 nm. It was confirmed that although the resistance temperature coefficients were in the range of −100 ppm/° C. or more to +100 ppm/° C. or less, the current noise was high.

From the evaluation results indicated in Table 1 above, it was confirmed that in the thick film resistor, which was manufactured from the thick film resistor composition and the thick film resistor paste including the ruthenium oxide powder of practical examples 1 to 4 in which the crystallite diameter D1 and the specific surface area diameter D2 are controlled to a predetermined range, the resistance temperature coefficient was close to zero and the electrical characteristics were excellent.

Therefore, it was confirmed that the thick film resistor using the thick film resistor composition and the thick film resistor paste including the above ruthenium oxide powder, for example, an electronic component such as a chip resistor, a hybrid IC, a resistance network and the like, has a resistance temperature coefficient close to zero, has excellent electrical characteristics, and can exhibit high performance.

Although the ruthenium oxide powder, the thick film resistor composition, the thick film resistor paste, and the thick film resistor have been described in the above embodiments and examples, etc., the present invention is not limited to the above-described embodiments and examples, etc. Various modifications and variations are possible within the scope of the present invention as described in the claims.

The present international patent application is based on and claims priority to Japanese Patent Application No. 2017-063653, filed on Mar. 28, 2017, the contents of which are incorporated herein by reference in their entirety.

The invention claimed is:

1. A ruthenium oxide powder having a rutile crystal structure, wherein
   a crystallite diameter D1, calculated from a peak of a (110) plane measured by an X-ray diffraction method, is 25 nm or more and 80 nm or less,
   a specific surface area diameter D2, calculated from a specific surface area, is 25 nm or more and 114 nm or less, and
   a ratio of the crystallite diameter D1 (nm) to the specific surface area diameter D2 (nm) satisfies a following formula (1)

$$0.70 \leq D1/D2 \leq 1.00 \tag{1}$$

2. A thick film resistor composition comprising:
   the ruthenium oxide powder according to claim 1; and
   a glass powder.

3. The thick film resistor composition according to claim 2, wherein a ratio of the ruthenium oxide powder is 5% by mass or more and 50% by mass or less, with respect to the ruthenium oxide powder and the glass powder.

4. The thick film resistor composition according to claim 2, wherein the glass powder has a 50% volume cumulative particle size of 5 m or less.

5. A thick film resistor paste in which the thick film resistor composition according to claim 2 is dispersed in an organic vehicle.

6. A thick film resistor comprising:
   the ruthenium oxide powder according to claim 1; and
   a glass component.

7. The thick film resistor according to claim 6, wherein a ratio of the ruthenium oxide powder is 5% by mass or more and 50% by mass or less, with respect to the ruthenium oxide powder and the glass component.

* * * * *